(12) United States Patent
Morie (10) Patent No.: US 10,520,226 B2
(45) Date of Patent: Dec. 31, 2019

(54) CRYOCOOLER

(71) Applicant: SUMITOMO HEAVY INDUSTRIES, LTD., Tokyo (JP)

(72) Inventor: Takaaki Morie, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 133 days.

(21) Appl. No.: 15/719,087

(22) Filed: Sep. 28, 2017

(65) Prior Publication Data
US 2018/0094837 A1  Apr. 5, 2018

(30) Foreign Application Priority Data

Oct. 3, 2016  (JP) .................. 2016-195867

(51) Int. Cl.
| | | |
|---|---|---|
| *F25B 9/14* | (2006.01) | |
| *H02K 5/10* | (2006.01) | |
| *H02K 11/01* | (2016.01) | |
| *H02K 55/04* | (2006.01) | |
| *H02K 7/116* | (2006.01) | |

(52) U.S. Cl.
CPC ................. *F25B 9/14* (2013.01); *H02K 5/10* (2013.01); *H02K 7/116* (2013.01); *H02K 11/01* (2016.01); *H02K 55/04* (2013.01); *F25B 2309/006* (2013.01)

(58) Field of Classification Search
CPC ..... F25B 9/14; F25B 2309/006; H02K 11/01; H02K 5/10
See application file for complete search history.

(56) References Cited

U.S. PATENT DOCUMENTS

| | | |
|---|---|---|
| 4,606,194 A | 8/1986 | Pirtle et al. |
| 5,711,157 A | 1/1998 | Ohtani et al. |
| 7,538,649 B2 | 5/2009 | Nakayama et al. |
| 8,307,666 B2 | 11/2012 | Woidtke et al. |
| 2018/0083507 A1* | 3/2018 | Tokizaki .................. B60S 1/26 |

FOREIGN PATENT DOCUMENTS

| | | |
|---|---|---|
| JP | H06-188466 A | 7/1994 |
| JP | 2005-160277 A | 6/2005 |

* cited by examiner

*Primary Examiner* — Brian M King
(74) *Attorney, Agent, or Firm* — Michael Best & Friedrich LLP (57) ABSTRACT

A cryocooler include a pressure control valve, a valve housing which accommodates the pressure control valve, a motor which includes a motor output shaft, a reduction mechanism which connects the motor output shaft to the pressure control valve in a power transmittable manner, and a magnetic shield case which encloses the motor and is hermetically connected to the valve housing. The motor may include a motor case from which the motor output shaft protrudes. The magnetic shield case may enclose the motor outside the motor case.

6 Claims, 6 Drawing Sheets

CRYOCOOLER

RELATED APPLICATIONS

Priority is claimed to Japanese Patent Application No. 2016-195867, filed Oct. 3, 2016, the entire content of which is incorporated herein by reference.

BACKGROUND

Technical Field

Certain embodiments of the present invention relate to a cryocooler.

Description of Related Art

A cryocooler represented by a Gifford-McMahon (GM) cryocooler includes a valve which controls a pressure of an expansion chamber. This pressure control valve is configured to alternately switch a supply of a high-pressure refrigerant gas to the expansion chamber and a recovery of a low-pressure refrigerant gas from the expansion chamber. An electromagnetic motor which drives the pressure control valve is provided in the cryocooler.

SUMMARY

According to an embodiment of the present invention, there is provided a cryocooler including: a pressure control valve; a valve housing which accommodates the pressure control valve; an electromagnetic motor which includes a motor case and a motor output shaft which protrudes from the motor case; a reduction mechanism which connects the motor output shaft to the pressure control valve in a power transmittable manner; and a magnetic shield case which encloses the electromagnetic motor outside the motor case and is hermetically connected to the valve housing.

According to another embodiment of the present invention, there is provided a cryocooler including: a pressure control valve; a valve housing which accommodates the pressure control valve; an electromagnetic motor which includes a motor output shaft; a reduction mechanism which connects the motor output shaft to the pressure control valve in a power transmittable manner; and a magnetic shield case which encloses the electromagnetic motor and is hermetically connected to the valve housing.

DETAILED DESCRIPTION

A cryocooler may be used in a strong magnetic field environment. For example, the cryocooler is used to cool a superconducting coil for generating a strong magnetic field.

It is desirable to provide a technology to decrease influences of a strong magnetic field with respect to an electromagnetic motor of a cryocooler.

According to the present invention, it is possible to provide a technology to decrease influences of a strong magnetic field with respect to an electromagnetic motor of a cryocooler.

Hereinafter, embodiments of the present invention will be described in detail with reference to the drawings. In addition, in descriptions thereof, the same reference numerals are assigned to the same elements, and overlapping descriptions are appropriately omitted. Moreover, configurations described below are exemplified and do not limit the scope of the present invention.

In general, as a drive source of a pressure control valve in a cryocooler, an electromagnetic motor, for example, a rotary electric motor is used. An application example of the cryocooler is cooling of a superconducting coil generating a strong magnetic field. When the cryocooler is operated in a strong magnetic field, the magnetic field may decrease a rated torque of a motor. Insufficient torque may cause the motor to step out or slip. For example, in a case of a GM cryocooler, operations of the pressure control valve and a displacer at a constant speed may be hindered and thus, refrigerating capacity decreases.

In order to prevent a strong magnetic field from acting on the motor, a magnetic shield may be installed in the cryocooler. In order to effectively prevent the influences of the strong magnetic field, it is desirable that the magnetic shield has a sufficient thickness. However, in the magnetic shield, side effects such as significant increases in weight and dimensions of the cryocooler may occur. Moreover, the magnetic shield is magnetized by the strong magnetic field, and thus, an undesirable strong electromagnetic suction force may be generated.

Accordingly, a cryocooler according to an embodiment includes a cryocooler drive portion housing structure which realizes both shielding of an external magnetic field and holding of airtightness of a refrigerant gas. Accordingly, compared to a case where a magnetic shield is separately installed outside a cryocooler housing which is a hermetic container, the cryocooler drive portion can have smaller external dimensions. In addition, since the cryocooler drive portion housing structure has both of the shielding of the external magnetic field and the holding of the airtightness, an excessive increase in the size of the magnetic shield is prevented.

In addition, in the embodiment, the cryocooler drive portion is not configured to drive the valve directly, but an electromagnetic motor for driving the valve is connected to the pressure control valve via a reduction mechanism. Since torque output from the motor is increased by the reduction mechanism, a smaller motor can be adopted in the cryocooler drive portion as the valve drive electromagnetic motor. If the size of the motor is small, the dimensions of the magnetic shield required to surround the motor decrease.

According to examinations of the inventors, when a thickness of the magnetic shield is constant, if a diameter of the magnetic shield decreases, magnetic shield efficiency is improved. The magnetic shield efficiency is a value indicating a degree to which the magnetic field in the magnetic shield is decreased by the magnetic shield, and for example, is a ratio of a difference between the external magnetic field to be shielded and the magnetic field decreased in the shield with respect to the external magnetic field. If the magnetic shield efficiency is improved, a magnetic shield having desired magnetic shield performance can be formed of a smaller amount of shield material. Accordingly, by incorporating the reduction mechanism into the cryocooler drive portion, it is possible to shield an external strong magnetic field by a small and light magnetic shield. In addition, the cryocooler having the magnetic shield and the drive motor can have the same size as the existing cryocooler, or preferably, a smaller size than that of the existing cryocooler.

Therefore, the cryocooler according to the embodiment can decrease influences of a strong magnetic field applied to an electromagnetic motor of a cryocooler.

Figure 1:
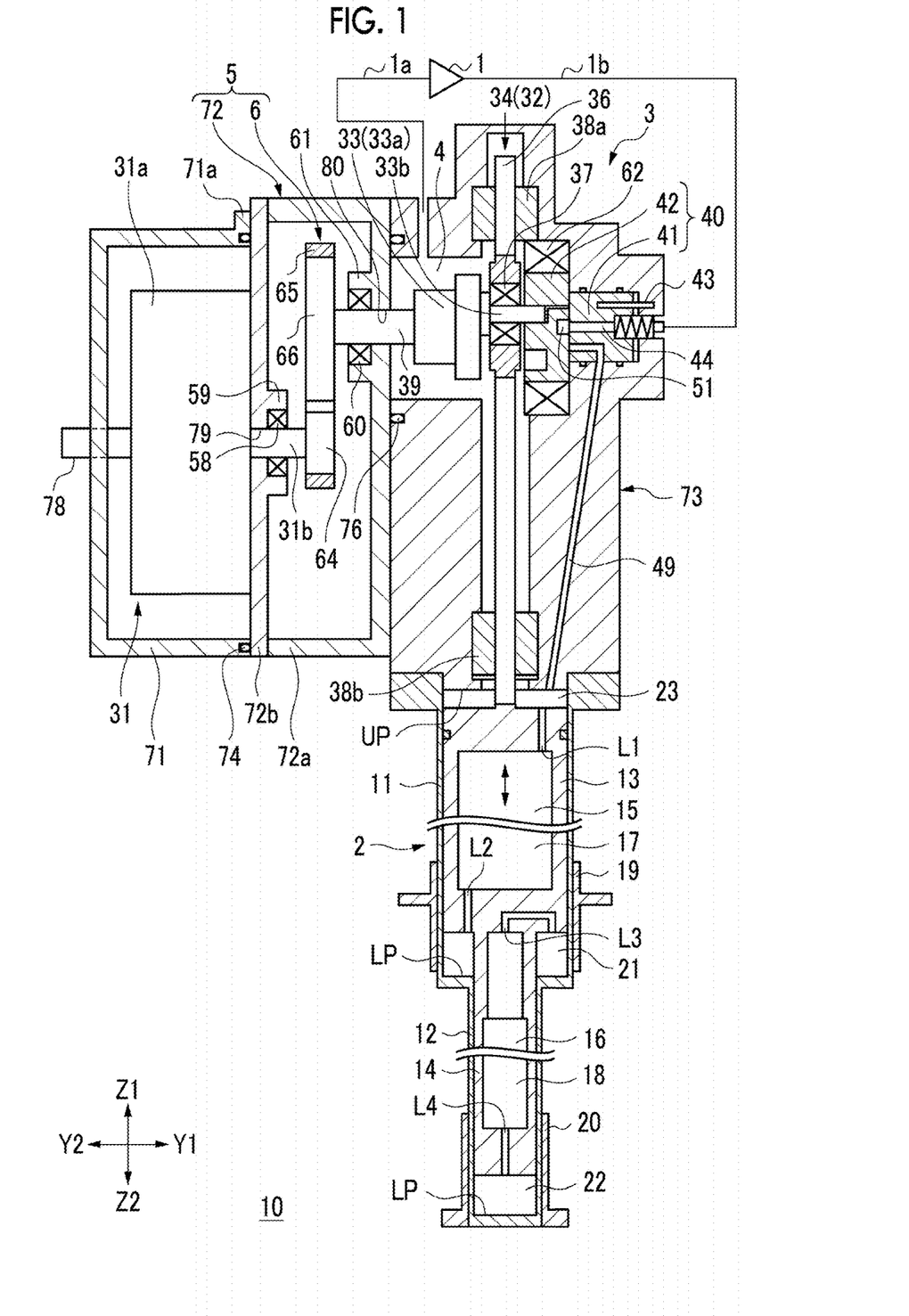
FIG. 1 is a view schematically showing an internal structure of a cryocooler according to an embodiment.
Figure 2:
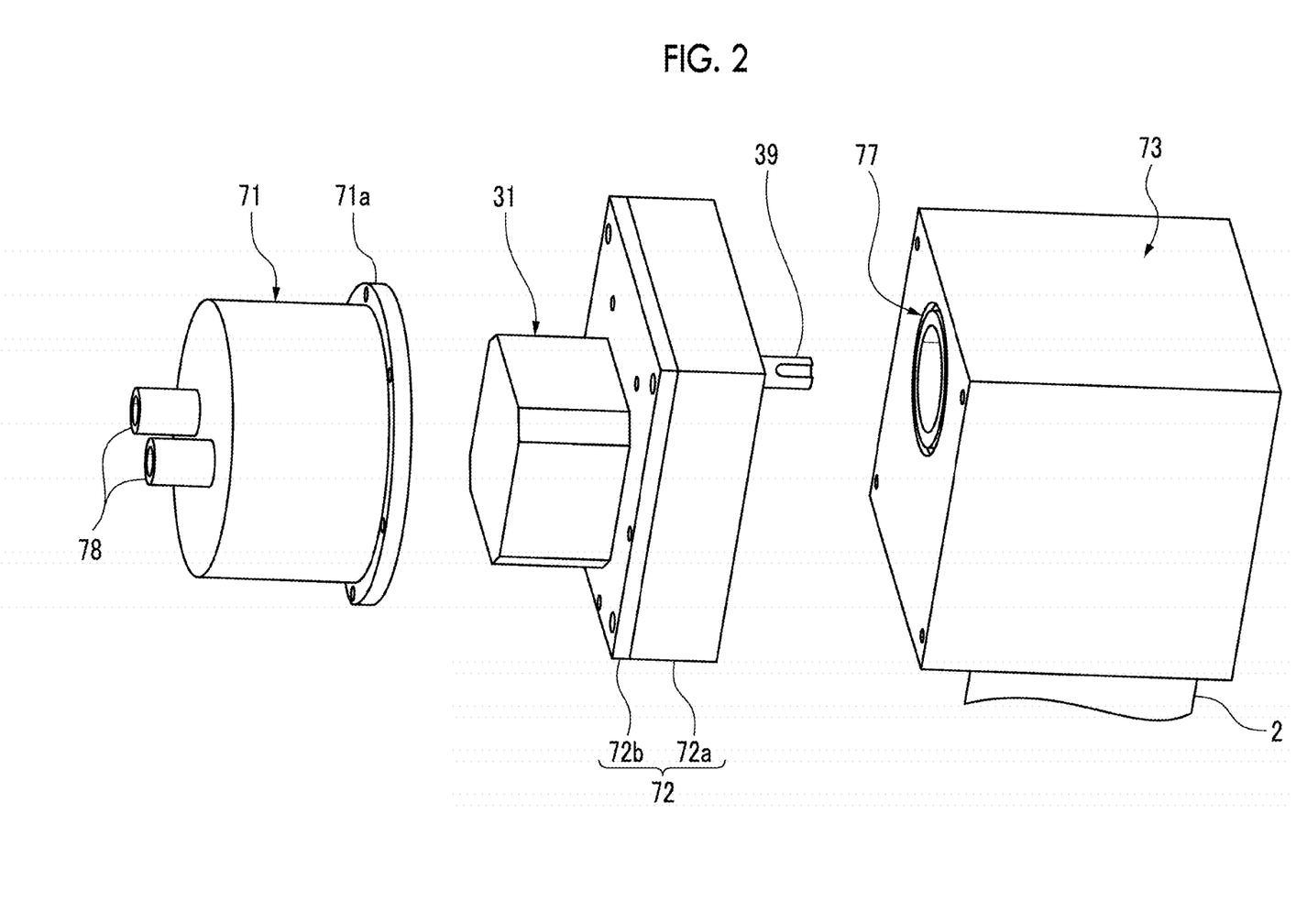
FIG. 2 is an exploded perspective view schematically showing a drive portion of the cryocooler according to the embodiment.
Figure 3:
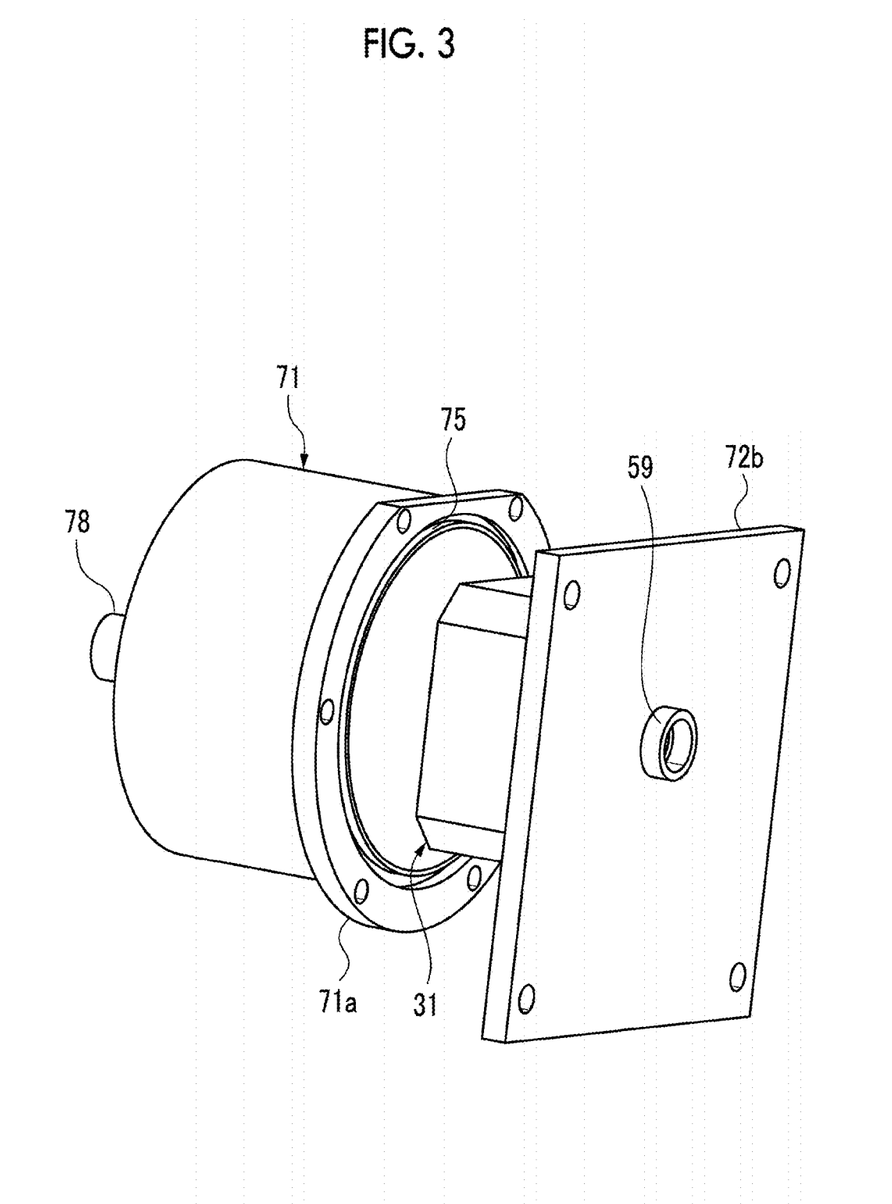
FIG. 3 is an exploded perspective view schematically showing a drive portion of the cryocooler according to the embodiment.
Figure 4:
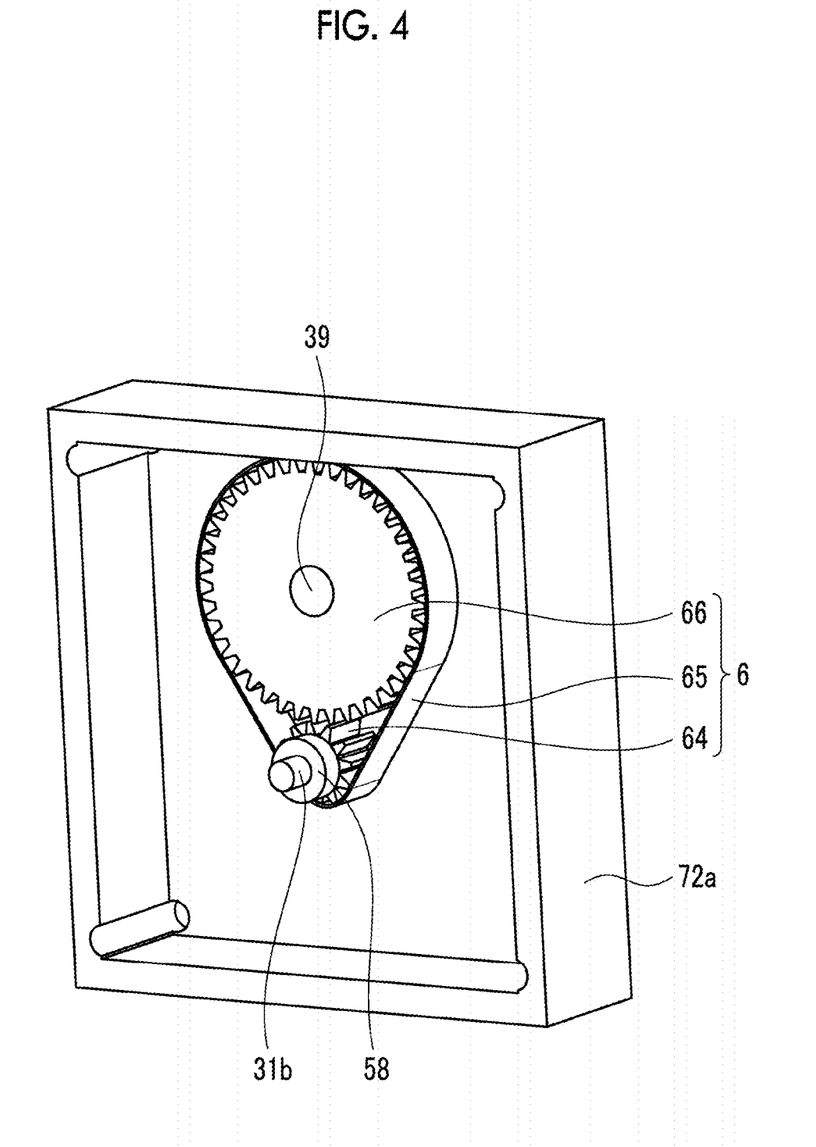
FIG. 4 is a view schematically showing an internal structure of an example of a speed reducer used in the cryocooler according to the embodiment.
Figure 5:
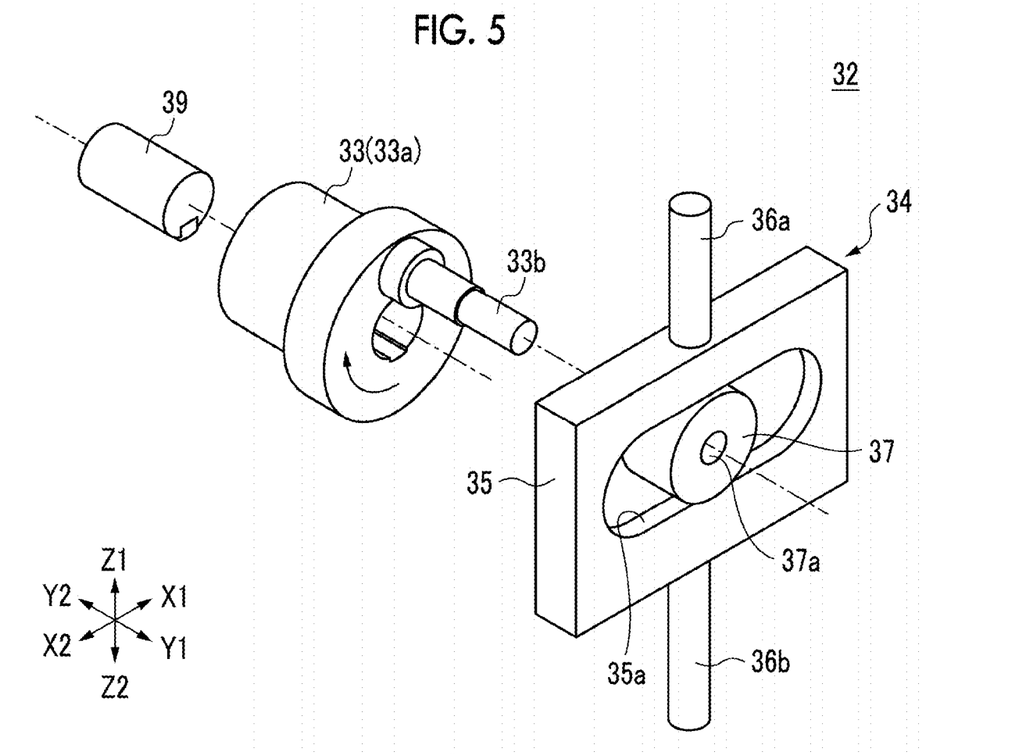
FIG. 5 is an exploded perspective view schematically showing a portion of the drive portion of the cryocooler according to the embodiment in an enlarged manner.
Figure 6:
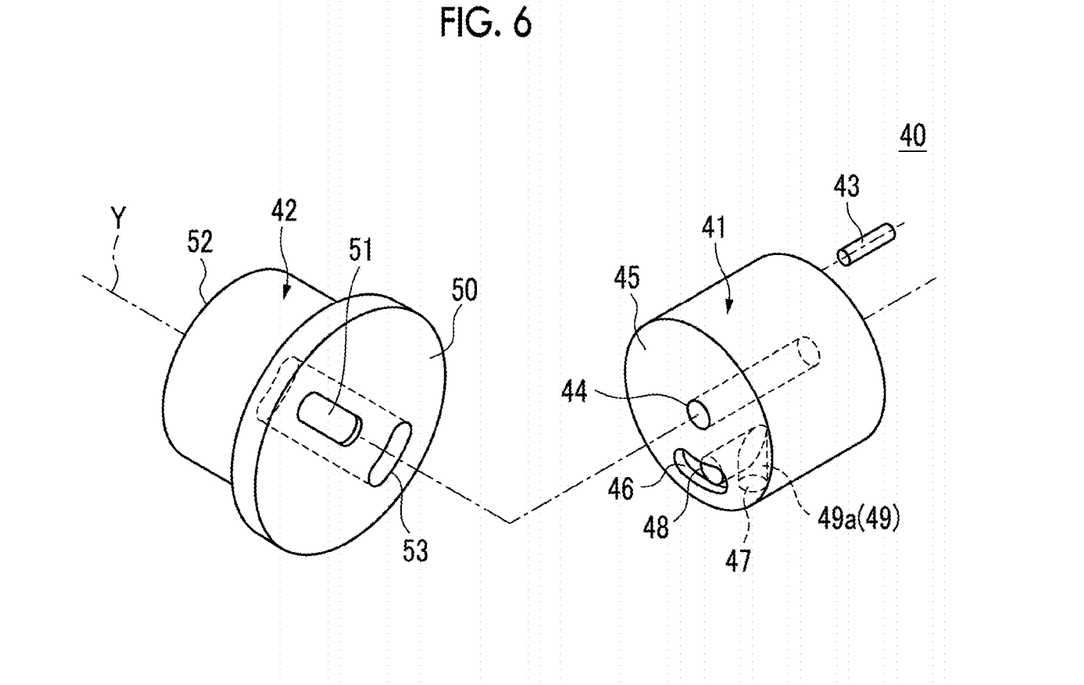
FIG. 6 is an exploded perspective view schematically showing an example of a valve portion used in the cryocooler according to the embodiment in an enlarged manner.

First, an overall configuration of the cryocooler of the embodiment will be described. FIGS. 1 to 6 are views for explaining the cryocooler according to the embodiment. FIG. 1 is a view schematically showing an internal structure of the cryocooler according to the embodiment. FIGS. 2 and 3 are exploded perspective views schematically showing the drive portion of the cryocooler according to the embodiment. FIG. 4 is a view schematically showing an internal structure of an example of a speed reducer used in the cryocooler according to the embodiment. FIG. 5 is an exploded perspective view schematically showing a portion of the drive portion of the cryocooler according to the embodiment in an enlarged manner. FIG. 6 is an exploded perspective view schematically showing an example of the valve portion used in the cryocooler according to the embodiment in an enlarged manner.

Hereinafter, for example, a GM cryocooler 10 is described as the cryocooler. However, the cryocooler according to the embodiment is not limited to the GM cryocooler. The present invention can be applied to any type of cryocooler as long as it includes a motor to drive a valve, and for example, can be applied to Solvay cryocooler or a pulse tube cryocooler.

The GM cryocooler 10 includes a compressor 1, a cylinder 2, and a drive portion housing 3.

The compressor 1 recovers a low-pressure refrigerant gas from an intake side to which a low-pressure pipe 1a is connected, compresses the low-pressure refrigerant gas, and thereafter, supplies a high-pressure refrigerant gas to a high-pressure pipe 1b connected to a discharge side. For example, a helium gas can be used as the refrigerant gas. However, the refrigerant gas is not limited to this. Moreover, as is known, gas pressures of the low-pressure pipe 1a and the high-pressure pipe 1b are much higher than the atmospheric pressure. Typically, for example, the high pressure is 2 to 3 MPa, and the low pressure is 0.5 to 1.5 MPa. For example, a difference between the high pressure and the low pressure is approximately 1.2 to 2 MPa.

The GM cryocooler 10 is a two-stage type cryocooler. Accordingly, the cylinder 2 includes two cylinders such as a high-temperature side cylinder 11 and a low-temperature side cylinder 12. A high-temperature side displacer 13 is inserted inside the high-temperature side cylinder 11. In addition, a low-temperature side displacer 14 is inserted inside the low-temperature side cylinder 12. Moreover, it is needless to say that the present invention can be applied to a single-stage type cryocooler or other cryocoolers.

The high-temperature side displacer 13 and the low-temperature side displacer 14 are connected to each other and are each configured to be able to reciprocate in an axial direction of each cylinder inside the high-temperature side cylinder 11 and the low-temperature side cylinder 12. A high-temperature side internal space 15 and a low-temperature side internal space 16 are each formed inside the high-temperature side displacer 13 and the low-temperature side displacer 14. The high-temperature side internal space 15 and the low-temperature side internal space 16 are filled with regenerator materials, and the regenerator materials function as a high-temperature side regenerator 17 and a low-temperature side regenerator 18, respectively.

The high-temperature side displacer 13 which is positioned on the upper portion is connected to a drive shaft 36 which extends toward the upper side (Z1 direction). The drive shaft 36 configures a portion of a scotch yoke mechanism 32 described later.

A high-temperature side expansion space 21 is formed on a low-temperature side end portion (an end portion on a side in a direction shown by an arrow Z2 in FIG. 1) of the high-temperature side cylinder 11. In addition, an upper chamber 23 is formed on a high-temperature side end portion (an end portion on a side in a direction shown by an arrow Z1 in FIG. 1) of the high-temperature side cylinder 11. A low-temperature side expansion space 22 is formed in on low-temperature side end portion (an end portion on the side in a direction shown by the arrow Z2 in FIG. 1) inside the low-temperature side cylinder 12.

A gas flow path L1 is formed on a high-temperature end side (an end portion on the side in the Z1 direction) of the high-temperature side displacer 13. In addition, a gas flow-path L2, through which the high-temperature side internal space 15 and the high-temperature side expansion space 21 communicate with each other, is formed on the low-temperature end side (the end portion on the side in the Z2 direction) of the high-temperature side displacer 13.

The low-temperature side displacer 14 is attached to the lower portion of the high-temperature side displacer 13 by a connection mechanism (not shown). A gas flow path L3, through which the high-temperature side expansion space 21 and the low-temperature side internal space 16 communicate with other, is formed on the high-temperature side end portion (the end portion on the side in the direction shown by the arrow Z1 in FIG. 1) of the low-temperature side displacer 14. In addition, a gas flow path L4, through which the low-temperature side internal space 16 and the low-temperature side expansion space 22 communicate with other, is formed on the low-temperature side end portion (the end portion on the side in the direction shown by the arrow Z2 in FIG. 1) of the low-temperature side displacer 14.

A high-temperature side cooling stage 19 is disposed at a position facing the high-temperature side expansion space 21 on an outer peripheral surface of the high-temperature side cylinder 11. In addition, a low-temperature side cooling stage 20 is disposed at a position facing the low-temperature side expansion space 22 on an outer peripheral surface of the low-temperature side cylinder 12.

The high-temperature side displacer 13 and the low-temperature side displacer 14 are moved in the high-temperature side cylinder 11 and the low-temperature side cylinder 12 in up and down directions (directions of arrows Z1 and Z2) in the drawings by the scotch yoke mechanism 32.

The drive portion housing 3 includes a magnetic shield case 71 which is a motor accommodation portion, a speed reducer case 72, and a valve housing 73. The magnetic shield case 71 is hermetically connected to the valve housing 73 via the speed reducer case 72. That is, the magnetic shield case 71 is hermetically connected to the speed reducer case 72 and the speed reducer case 72 is hermetically connected to the valve housing 73.

The speed reducer case 72 includes a speed reducer case body 72a and a magnetic shield member 72b. The speed reducer case body 72a is hermetically connected to the magnetic shield member 72b.

Each of the magnetic shield case 71 and the magnetic shield member 72b is formed of a magnetic material such as a steel material. Accordingly, the magnetic shield case 71 forms a magnetic shield of an electromagnetic motor (hereinafter, simply referred to as a "motor") 31 which is a drive source of the GM cryocooler 10, along with the magnetic shield member 72b. Meanwhile, each of the speed reducer case body 72a and the valve housing 73 is formed of a nonmagnetic material such as stainless steel or an aluminum alloy. Accordingly, a part of the speed reducer case 72 adjacent to the valve housing 73 is formed of a nonmagnetic material and a part of the speed reducer case 72 adjacent to the magnetic shield case 71 is formed of a magnetic material.

The hermetic connection is realized by various and appropriate mechanisms such as an O ring or welding. For example, in order to hermetically connect the magnetic shield case 71 and the magnetic shield member 72b, a first seal portion 74 such as an O ring is provided between the magnetic shield case 71 and the magnetic shield member 72b. The magnetic shield case 71 is fixed to the magnetic shield member 72b using a fastening member (not shown) such as a bolt. A first O ring groove 75 receiving an O ring is formed on a flange portion 71a of the magnetic shield case 71.

Similarly, in order to hermetically connect the valve housing 73 and the speed reducer case body 72a, a second seal portion 76 such as an O ring is provided between the valve housing 73 and the speed reducer case body 72a. The valve housing 73 is fixed to the speed reducer case body 72a using a fastening member (not shown) such as a bolt. A second O ring groove 77 receiving an O ring is formed on the valve housing 73.

The speed reducer case body 72a and the magnetic shield member 72b are fixed to each other by welding.

In this way, the drive portion housing 3 is configured as a hermetic container having airtightness which accommodates the drive portion of the GM cryocooler 10. Accordingly, hereinafter, in the present specification, an accommodation space inside the drive portion housing 3 is referred to as a "hermetic container 4". The hermetic container 4 communicates with an intake port of the compressor 1 via the low-pressure pipe 1a. Accordingly, a pressure of the hermetic container 4 is always maintained at a low pressure. In FIG. 1, the valve housing 73 is connected to the low-pressure pipe 1a. However, other portions of the drive portion housing 3, for example, the magnetic shield case 71 or the speed reducer case 72 may be connected to the low-pressure pipe 1a.

Moreover, the drive portion of the GM cryocooler 10 includes a gear box 5 which is the speed reducer, the scotch yoke mechanism 32, and a rotary valve 40 which is an example of the pressure control valve, in addition to the motor 31. As described later, it is possible to control the pressures of the high-temperature side expansion space 21 and the low-temperature side expansion space 22 by the rotary valve 40. As shown in FIG. 1, the motor 31 is accommodated in the magnetic shield case 71, and the scotch yoke mechanism 32 and the rotary valve 40 are accommodated in the drive portion housing 3. The drive portion housing 3 is provided as a valve housing which accommodates the pressure control valve. The gear box 5 includes a reduction mechanism 6 in addition to the speed reducer case 72. The reduction mechanism 6 is accommodated in the speed reducer case 72.

The motor 31 includes a motor case 31a and a motor output shaft 31b which protrudes from the motor case 31a. The motor case 31a defines an outer peripheral surface of the motor 31. A motor body (not shown) including a stator and a rotor is accommodated in the motor case 31a. The motor output shaft 31b is rotatable with respect to the motor case 31a. The motor output shaft 31b rotates along with the rotor. The magnetic shield case 71 encloses the motor 31 outside the motor case 31a.

As is shown, a gap is provided between the magnetic shield case 71 and the motor case 31a. Alternatively, an inner surface of the magnetic shield case 71 may come into contact with the motor case 31a.

The motor 31 may not include the motor case 31a. In this case, the stator of the motor 31 is exposed to the magnetic shield case 71 and the magnetic shield case 71 may enclose the motor body.

The magnetic shield case 71 has a cylindrical shape in which one end thereof is open and the other end is closed. However, the shape of the magnetic shield case 71 is arbitrary and may be a rectangular parallelepiped shape or other shapes. A motor connector 78 for connecting wires for supplying power to the motor 31 and/or controlling the motor 31 to the motor 31 is provided on a closed end of the magnetic shield case 71. The flange portion 71a is provided over the entire circumference of the magnetic shield case 71 on the open end of the magnetic shield case 71. As described above, the first O ring groove 75 is formed on the flange portion 71a and the first seal portion 74 is annularly disposed along the flange portion 71a.

The magnetic shield member 72b includes a through-hole 79 through which the motor output shaft 31b passes and is disposed between the motor case 31a and the reduction mechanism 6. The magnetic shield member 72b is a flat plate-shaped member. The motor 31, specifically, the motor case 31a is attached to one surface of the magnetic shield member 72b and the opposite surface of the magnetic shield member 72b faces the reduction mechanism 6. The through-hole 79 is formed at an approximately center portion of the magnetic shield member 72b. A bearing 58 which supports the motor output shaft 31b is disposed in the through-hole 79. In the magnetic shield member 72b, a bearing holder 59 which supports the bearing 58 is formed so as to surround the through-hole 79.

The reduction mechanism 6 connects the motor output shaft 31b to the rotary valve 40 in a power transmittable manner. The reduction mechanism 6 includes a pinion 64, a transmission belt 65, and a reduction gear 66. The pinion 64 is connected to the motor output shaft 31b. For example, the transmission belt 65 is a timing belt and the reduction gear 66 has a larger diameter than that of the pinion 64. The pinion 64 engages with the transmission belt 65, the reduction gear 66 engages with the transmission belt 65, and the pinion 64 and the reduction gear 66 do not come into contact with each other. In this way, a belt transmission type reduction mechanism is configured. The belt transmission type reduction mechanism is preferable in that a lubricant (for example, oil or grease) is not required or a use amount thereof can be minimized, and thus, lubricant contamination of the refrigerant gas of the GM cryocooler 10 is less likely to occur. In addition, the reduction mechanism 6 is not limited to the belt transmission type reduction mechanism and may be any other reduction mechanism such as a gear mechanism.

The reduction gear 66 is connected to a drive rotary shaft 39. The speed reducer case body 72a includes a through-hole 80 through which the drive rotary shaft 39 passes. A bearing 60 which supports the drive rotary shaft 39 is disposed in the through-hole 80. In the speed reducer case body 72a, a bearing holder 61 which supports the bearing 60 is formed to surround the through-hole 80. Since the drive rotary shaft 39 is disposed at a position eccentric from the motor output shaft 31b, the through-hole 80 is also formed at a location eccentric from the through-hole 79. The speed reducer case body 72a has a rectangular parallelepiped shape in which one end thereof is open and the other end is closed. However, the speed reducer case body 72a is not limited to this and may have other shapes. The open side of the speed reducer case body 72a is closed by the magnetic shield member 72b, and the through-hole 80 is formed on a side opposite to the open side.

The motor 31 generates a rotary drive force and the motor output shaft 31b is rotated by the rotary drive force. The pinion 64 of the reduction mechanism 6 rotates along with the motor output shaft 31b and the reduction gear 66 rotates via the transmission belt 65. The drive rotary shaft 39 rotates along with the reduction gear 66. In this way, a rotary motion of the motor 31 is reduced by the reduction mechanism 6 and is transmitted to the scotch yoke mechanism 32 and the rotary valve 40. That is, output torque of the motor 31 is increased by the reduction mechanism 6 and the scotch yoke mechanism 32 and the rotary valve 40 are driven by the increased torque.

FIG. 5 shows the scotch yoke mechanism 32 in an enlarged manner. The scotch yoke mechanism 32 includes a crank 33, a scotch yoke 34, or the like.

The crank 33 is fixed to the drive rotary shaft 39. The crank 33 is configured such that a crank pin 33b is provided at a position eccentric from the attachment position of the drive rotary shaft 39. Accordingly, if the crank 33 is attached to the drive rotary shaft 39, the crank pin 33b is eccentric with respect to the drive rotary shaft 39. Therefore, the crank pin 33b functions as an eccentric rotary body. In addition, the drive rotary shaft 39 may be rotatably supported at a plurality of locations in a longitudinal direction thereof.

The scotch yoke 34 may include a drive shaft 36a, a drive shaft 36b, a yoke plate 35, and a roller bearing 37. These are accommodated in the valve housing 73.

The drive shaft 36a extends upward (Z1 direction) from the yoke plate 35. The drive shaft 36a is supported by a sliding bearing 38a which is provided inside the valve housing 73. Accordingly, the drive shaft 36a is configured to be movable in up and down directions (directions shown by arrows Z1 and Z2 in the drawings) in the drawings.

The drive shaft 36b extends downward (Z2 direction) from the yoke plate 35. The drive shaft 36b is supported by a sliding bearing 38b which is provided inside the valve housing 73. Therefore, the drive shaft 36b is also configured to be movable in up and down directions (directions shown by arrows Z1 and Z2 in the drawings) in the drawings.

The drive shaft 36a and the drive shaft 36b are each supported by the sliding bearing 38a and the sliding bearing 38b, and thus, the scotch yoke 34 is configured to be movable in the up and down directions (directions shown by arrows Z1 and Z2 in the drawings) inside the valve housing 73.

In addition, in the present embodiment, in order to clearly indicate a positional relationship of components of the cryocooler, a term such as an "axial direction" is used. The axial direction indicates a direction in which the drive shaft 36a and the drive shaft 36b extend and is coincident with the direction in which the high-temperature side displacer 13 and the low-temperature side displacer 14 move. For convenience, a side which is relatively close to the expansion space or the cooling stage in the axial direction may be referred to as a "lower side", and a side which is relatively far from them may be referred to an "upper side". That is, a side relatively far from the low-temperature side end portion may be referred to the "upper side", and a side relatively close to the low-temperature side end portion may be referred to the "lower side". In addition, these expressions are not related to a disposition when the GM cryocooler 10 is installed in site. For example, the GM cryocooler 10 may be attached in a state where the expansion space facing upward in a vertical direction.

In the yoke plate 35, a laterally elongated window 35a is formed. The laterally elongated window 35a extends in a direction intersecting the drive shaft 36a and a direction in which the drive shaft 36b extends, for example, a direction (directions shown by arrows X1 and X2 in FIG. 5) orthogonal to the drive shaft 36a.

The roller bearing 37 is disposed in the laterally elongated window 35a. The roller bearing 37 is configured to be rollable in the laterally elongated window 35a. In addition, a hole 37a which engages with the crank pin 33b is formed at a center position of the roller bearing 37. The laterally elongated window 35a admits movements of the crank pin 33b and the roller bearing 37 in the lateral direction. The laterally elongated window 35a includes an upper frame portion and a lower frame portion which extend in the lateral direction, and a first side frame portion and a second side frame portion which extends in the axial direction or the vertical direction on end portions of the upper frame portion and the lower frame portion in the lateral direction and are connected to the upper frame portion and the lower frame portion.

If the motor 31 is driven and the drive rotary shaft 39 rotates, the crank pin 33b rotates to draw a circular arc. Accordingly, the scotch yoke 34 is reciprocated in the directions shown by arrows Z1 and Z2 in the drawings. In this case, the roller bearing 37 is reciprocated in the laterally elongated window 35a in the directions shown by arrows X1 and X2 in the drawings.

The high-temperature side displacer 13 is connected to the drive shaft 36b which is disposed in the lower portion of the scotch yoke 34. Accordingly, the scotch yoke 34 is reciprocated in the directions shown by arrows Z1 and Z2 in the drawings, and the high-temperature side displacer 13 and the low-temperature side displacer 14 connected to the high-temperature side displacer 13 are reciprocated in the high-temperature side cylinder 11 and the low-temperature side cylinder 12 in the directions shown by arrows Z1 and Z2.

Next, a valve mechanism will be described. The rotary valve 40 switches a flow path of a low-pressure refrigerant gas and a flow path of a high-pressure refrigerant gas. The rotary valve 40 is driven by the motor 31. The rotary valve 40 is functions as a supply valve for introducing a high-pressure refrigerant gas discharged from the discharge side of the compressor 1 to the upper chamber 23 of the high-temperature side displacer 13 and functions as an exhaust valve for introducing the refrigerant gas from the upper chamber 23 to the intake side of the compressor 1.

As shown in FIGS. 1 and 6, the rotary valve 40 includes a stator valve 41 and a rotor valve 42. The stator valve 41 includes a flat stator side sliding surface 45 and similarly, the rotor valve 42 includes a flat rotor side sliding surface 50. The stator side sliding surface 45 and the rotor side sliding surface 50 are in surface contact with each other, and thus, leakage of the refrigerant gas is prevented.

The stator valve 41 is fixed to the inner portion of the valve housing 73 by a fixing pin 43. The stator valve 41 is fixed by the fixing pin 43, and thus, a rotation of the stator valve 41 is restricted.

The stator valve 41 includes a refrigerant gas supply hole 44, an arc-shaped groove 46, and a gas flow path 49. The refrigerant gas supply hole 44 is connected to the high-pressure pipe 1b of the compressor 1 and is formed to penetrate a center portion of the stator valve 41.

The arc-shaped groove 46 is formed on the stator side sliding surface 45. The arc-shaped groove 46 has an arc shape having the refrigerant gas supply hole 44 as a center.

The gas flow path 49 is formed between the stator valve 41 and the valve housing 73. A one end portion on the valve side of the gas flow path 49 forms an opening portion 48 which is open to the inside of the arc-shaped groove 46. In addition, in the gas flow path 49, a discharge port 47 is open to the side surface of the stator valve 41. The discharge port 47 communicates with the gas flow path 49 inside the housing. In addition, the other end portion of the gas flow path 49 inside the housing is connected to the high-temperature side expansion space 21 via the upper chamber 23, the gas flow path L1, the high-temperature side regenerator 17, or the like.

Meanwhile, the rotor valve 42 is rotatably supported by a rotor valve bearing 62. An engagement hole (not shown) which engages with the crank pin 33b is formed on the opposite end surface 52 which is positioned on the side opposite to the rotor side sliding surface 50 of the rotor valve 42. When the crank pin 33b is inserted into the roller bearing 37, a tip portion of the crank pin 33b protrudes in the arrow Y1 direction from the roller bearing 37 (refer to FIG. 1). The tip portion of the crank pin 33b which protrudes from the roller bearing 37 engages with the engagement hole which is formed in the rotor valve 42. Accordingly, the crank pin 33b rotates (eccentrically rotates), and thus, the rotor valve 42 rotates in synchronization with the scotch yoke mechanism 32.

The rotor valve 42 includes an elongated groove 51 and an arc-shaped hole 53. The elongated groove 51 is formed on the rotor side sliding surface 50 so as to extend in the radial direction from the center thereof. In addition, the arc-shaped hole 53 penetrates from the rotor side sliding surface 50 of the rotor valve 42 to the opposite end surface 52 and is connected to the hermetic container 4. The arc-shaped hole 53 is formed to be positioned on the same circumference as the arc-shaped groove 46 of the stator valve 41.

A supply valve is configured of the refrigerant gas supply hole 44, the elongated groove 51, the arc-shaped groove 46, and the opening portion 48. In addition, an exhaust valve is configured of the opening portion 48, the arc-shaped groove 46, and the arc-shaped hole 53. In the present embodiment, spaces such as the elongated 1 groove 51 or the arc-shaped groove 46 existing inside the valve may be collectively referred to as a valve internal space.

In the GM cryocooler 10 configured as described above, if a rotary drive force of the motor 31 is transmitted to the scotch yoke mechanism 32 via the drive rotary shaft 39 to drive the scotch yoke mechanism 32, the scotch yoke 34 is reciprocated in the Z1 and Z2 directions. According to the movement of the scotch yoke 34, the high-temperature side displacer 13 and the low-temperature side displacer 14 are reciprocated in the high-temperature side cylinder 11 and the low-temperature side cylinder 12 between a bottom dead center LP and a top dead center UP.

Before the high-temperature side displacer 13 and the low-temperature side displacer 14 reach the bottom dead center LP, the exhaust valve is closed, and thereafter, the supply valve is open. That is, a refrigerant gas flow path is formed among the refrigerant gas supply hole 44, the elongated groove 51, the arc-shaped groove 46, and the gas flow path 49.

Accordingly, a high-pressure refrigerant gas starts to fill the upper chamber 23 from the compressor 1. Thereafter, the high-temperature side displacer 13 and the low-temperature side displacer 14 past the down dead center LP and start to move upwardly, the refrigerant gas passes through the high-temperature side regenerator 17 and the low-temperature side regenerator 18 downward from the upper chamber 23, and thus, the refrigerant gas gradually fills the high-temperature side expansion space 21 and the low-temperature side expansion space 22.

In addition, when the high-temperature side displacer 13 and the low-temperature side displacer 14 reach the top dead center UP, the supply valve is closed. Simultaneously with the closing of the supply valve or after the closing thereof, the exhaust valve is open. That is, a refrigerant gas flow path is formed among the gas flow path 49, the arc-shaped groove 46, and the arc-shaped hole 53.

Accordingly, the high-pressure refrigerant gas is expanded inside the high-temperature side expansion space 21 and the low-temperature side expansion space 22 to generate coldness, and thus, the high-temperature side cooling stage 19 and the low-temperature side cooling stage 20 are cooled. In addition, the low-temperature refrigerant gas which generates the coldness flows upwardly from the high-temperature side expansion space 21 and the low-temperature side expansion space 22 while cooling the regenerator material inside the high-temperature side regenerator 17 and the low-temperature side regenerator 18, and thereafter, returns to the low-pressure pipe 1a of the compressor 1.

Thereafter, before the high-temperature side displacer 13 and the low-temperature side displacer 14 reach the bottom dead center LP, the exhaust valve is open. Thereafter, the supply valve is open and one cycle ends. In this way, by repeating the cycle of the compression and the expansion of the refrigerant gas, the high-temperature side cooling stage 19 and the low-temperature side cooling stage 20 of the GM cryocooler 10 are cooled to cryogenic temperatures. The high-temperature side cooling stage 19 and the low-temperature side cooling stage 20 of the GM cryocooler 10 conduct the coldness, which is generated by expanding the refrigerant gas inside the high-temperature side expansion space 21 and low-temperature side expansion space 22, to the outsides of the high-temperature side cylinder 11 and the low-temperature side cylinder 12.

As described above, in the GM cryocooler 10 according to the embodiment, a drive force of a drive device such as the motor 31 is converted into reciprocating movements of the high-temperature side displacer 13 and the low-temperature side displacer 14 and pressure variations of the high-temperature side expansion space 21 and the low-temperature side expansion space 22 are generated in synchronization with the reciprocating movements. Accordingly, the high-temperature side cooling stage 19 and the low-temperature side cooling stage 20 are cooled. The temperature of the low-temperature side cooling stage 20 is a cryogenic temperature such as 4K.

An example of a cooling target of the GM cryocooler 10 according to the embodiment includes a superconducting coil. In general, the superconducting coil is used to generate a strong magnetic field. Accordingly, if the GM cryocooler 10 is used to cool the superconducting coil, the GM cryocooler 10 and the drive portion thereof are also exposed to the magnetic field generated by the superconducting coil.

However, the magnetic shield is provided in the GM cryocooler 10. Since the motor 31 is surrounded by the magnetic shield case 71 and the magnetic shield member 72b, the motor 31 is not exposed to a strong magnetic field of the superconducting coil. It is possible to prevent a decrease in rated torque of the motor 31 caused by the strong magnetic field, and thus, a decrease in refrigerating capacity of the GM cryocooler 10 is prevented.

In addition, the magnetic shield of the GM cryocooler 10, that is, the magnetic shield case 71 and the magnetic shield member 72b configure a portion of the hermetic container 4. The hermetic container 4 is formed by interconnections of the magnetic shield, the speed reducer case 72, and the valve housing 73. Accordingly, compared to a case where the magnetic shield is installed in the GM cryocooler 10 to be separated from the hermetic container 4, it is possible to decrease a size of the GM cryocooler 10. For example, if the outside of the hermetic container 4 is covered with the magnetic shield, a large and heavy magnetic shield is required. Conversely, if the magnetic shield is provided inside the hermetic container 4, the hermetic container 4 becomes large.

In addition, the reduction mechanism 6 is incorporated into the drive portion of the GM cryocooler 10, and thus, it is possible to decrease the size of the motor 31. Accordingly, as described above, it is possible to adopt a small and light magnetic shield. The GM cryocooler 10 having the magnetic shield and the drive motor can have the same size as the existing cryocooler, or preferably, a smaller size than that of the existing cryocooler.

Figure 7:
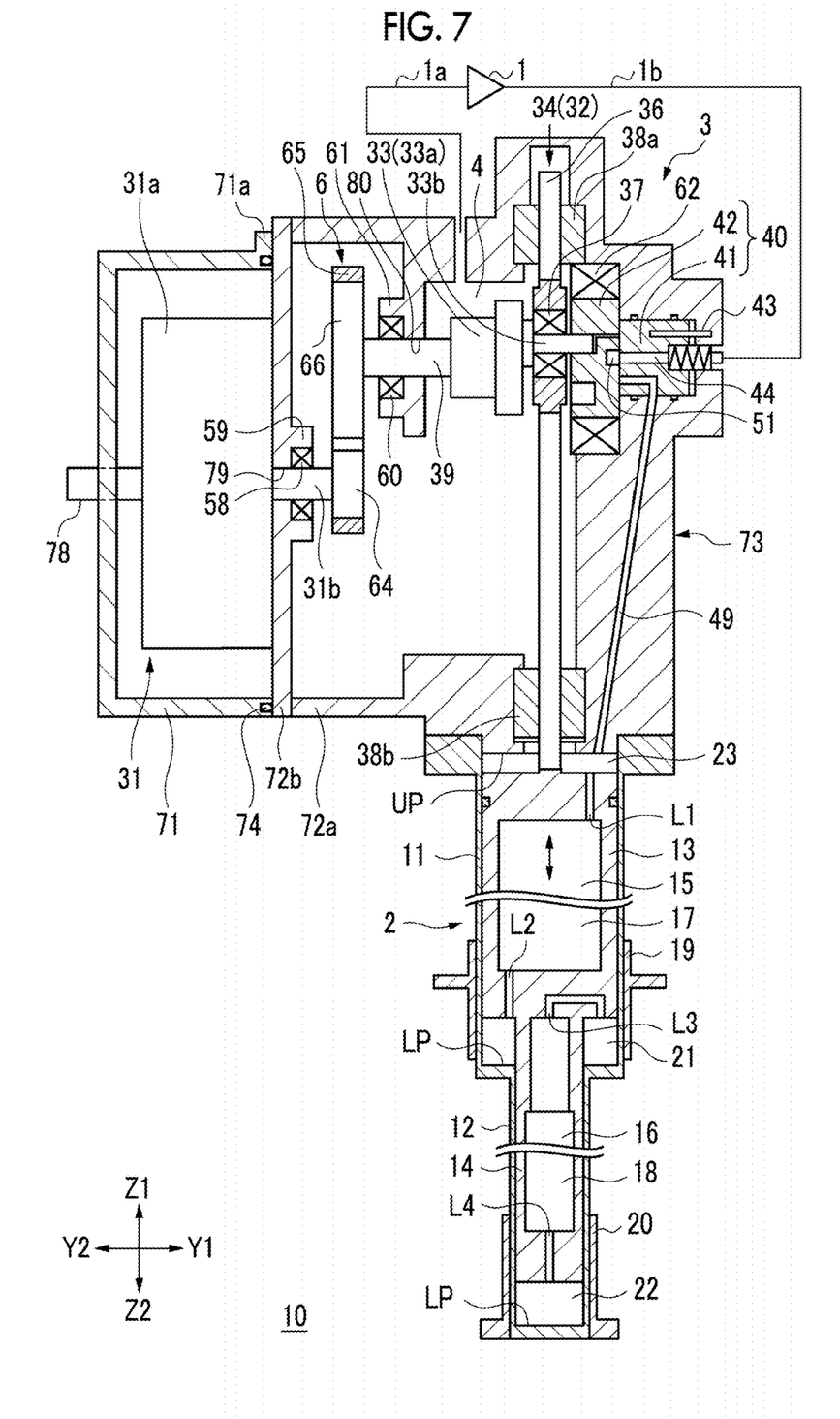
FIG. 7 is a view schematically showing an internal structure of a cryocooler according to another embodiment.

FIG. 7 is a view schematically showing an internal structure of a cryocooler according to another embodiment. This embodiment is similar to the embodiment described with reference to FIGS. 1 to 6 except for the disposition of the reduction mechanism 6. In the following descriptions, descriptions of the same portions will be appropriately omitted in order to avoid redundancy. The embodiment described with reference to FIGS. 1 to 6 and modification examples described in connection therewith can be appropriately combined with the embodiment described below.

Similarly to the GM cryocooler 10 shown in FIG. 1, the GM cryocooler 10 shown in FIG. 7 includes the reduction mechanism 6 which is disposed between the motor 31 and the rotary valve 40 and connects the motor output shaft 31b to the rotary valve 40 in a power transmittable manner. The reduction mechanism 6 includes the pinion 64, the transmission belt 65, and the reduction gear 66.

However, the reduction mechanism 6 is accommodated in the valve housing 73. In this way, the GM cryocooler 10 may not have a dedicated accommodation case for the reduction mechanism 6. In other words, the speed reducer case 72 shown in FIG. 1 may be integrated with the valve housing 73. Accordingly, the drive portion housing 3 includes the magnetic shield case 71 and the valve housing 73.

The valve housing 73 includes a valve housing body 73a formed of a nonmagnetic material and the magnetic shield member 72b formed of a magnetic material. The scotch yoke mechanism 32, the rotary valve 40, and the reduction mechanism 6 are accommodated in the valve housing body 73a. The magnetic shield member 72b is hermetically connected to the valve housing body 73a. The magnetic shield member 72b may be fixed to the valve housing body 73a by welding. The magnetic shield case 71 is hermetically connected to the magnetic shield member 72b. The first seal portion 74 such as an O ring is provided between the magnetic shield case 71 and the magnetic shield member 72b. In this way, the hermetic container 4 is formed by a hermetic connection between the magnetic shield case 71 and the valve housing 73.

The magnetic shield member 72b includes the through-hole 79 through which the motor output shaft 31b passes and is disposed between the motor case 31a and the reduction mechanism 6. The bearing 58 which supports the motor output shaft 31b is disposed in the through-hole 79. In the magnetic shield member 72b, the bearing holder 59 which supports the bearing 58 is formed so as to surround the through-hole 79. The pinion 64 is connected to the motor output shaft 31b. The reduction gear 66 is connected to the drive rotary shaft 39. The valve housing 73 includes the bearing holder 61 inside the valve housing 73. The bearing holder 61 is formed to surround the through-hole 80 through which the drive rotary shaft 39 passes. The bearing 60 which supports the drive rotary shaft 39 is disposed in the through-hole 80.

Also in the embodiment shown in FIG. 7, it is possible to protect the motor 31 from an external magnetic field by the magnetic shield case 71 and the magnetic shield member 72b.

Hereinbefore, the embodiments of the present invention are described. It should be understood that the present invention is not limited to the above-described embodiment, but may be modified into various forms on the basis of the spirit of the present invention. Additionally, the modifications are included in the scope of the invention.

According to the size and/or the direction of the external magnetic field, the magnetic shield member 72b is not indispensable. For example, if a component of the external magnetic field acting in an axial direction parallel to the motor output shaft 31b is not noticeable and a component of the external magnetic field acting in an in-plane direction perpendicular to the motor output shaft 31b is noticeable, the external magnetic field is sufficiently shielded by only the magnetic shield case 71. In this case, a portion corresponding to the magnetic shield member 72b in the above-described embodiments may be formed of a nonmagnetic material, and the whole of the speed reducer case 72 and/or the valve housing 73 may be formed of a nonmagnetic material. In addition, at least a portion of the magnetic shield case 71 may be formed of a nonmagnetic material, and the magnetic shield case 71 may include a portion formed of a nonmagnetic material and a portion formed of a magnetic material.

What is claimed is:

1. A cryocooler comprising:
 a pressure control valve;
 a valve housing which accommodates the pressure control valve;
 an electromagnetic motor which includes a motor case and a motor output shaft which protrudes from the motor case;
 a reduction mechanism which connects the motor output shaft to the pressure control valve in a power transmittable manner;
 a speed reducer case which accommodates the reduction mechanism and is hermetically connected to the valve housing; and a magnetic shield case which encloses the electromagnetic motor outside the motor case and is hermetically connected to the speed reducer case, wherein at least one of the valve housing, speed reducer case, and the magnetic shield case communicates with an intake port of a compressor such that the reduction mechanism is exposed to a low pressure refrigerant gas.

2. The cryocooler according to claim 1, wherein the speed reducer case includes a speed reducer case body formed of a nonmagnetic material, and a magnetic shield member which is formed of a magnetic material, is hermetically connected to the speed reducer case body, includes a through-hole through which the motor output shaft passes, and is disposed between the motor case and the reduction mechanism, and wherein the magnetic shield case is hermetically connected to the magnetic shield member.

3. A cryocooler comprising:

a pressure control valve;

a valve housing which accommodates the pressure control valve;

an electromagnetic motor which includes a motor case and a motor output shaft which protrudes from the motor case;

a reduction mechanism which connects the motor output shaft to the pressure control valve in a power transmittable manner; and a magnetic shield case which encloses the electromagnetic motor outside the motor case and is hermetically connected to the valve housing, wherein the reduction mechanism is accommodated in the valve housing.

4. The cryocooler according to claim 3, wherein the valve housing includes a valve housing body formed of a nonmagnetic material, and a magnetic shield member which is formed of a magnetic material, is hermetically connected to the valve housing body, includes a through-hole through which the motor output shaft passes, and is disposed between the motor case and the reduction mechanism, and wherein the magnetic shield case is hermetically connected to the magnetic shield member.

5. A cryocooler comprising:

a pressure control valve;

a valve housing which accommodates the pressure control valve;

an electromagnetic motor which includes a motor output shaft;

a reduction mechanism which connects the motor output shaft to the pressure control valve in a power transmittable manner;

a speed reducer case which accommodates the reduction mechanism and is hermetically connected to the valve housing; and a magnetic shield case which encloses the electromagnetic motor and is hermetically connected to the speed reducer case, wherein at least one of the valve housing, speed reducer case, and the magnetic shield case communicates with an intake port of a compressor such that the reduction mechanism is exposed to a low pressure refrigerant gas.

6. The cryocooler according to claim 1, wherein the reduction mechanism includes a transmission belt.

* * * * *